006 # United States Patent [19]

Sato et al.

[11] Patent Number: 4,735,839

[45] Date of Patent: Apr. 5, 1988

[54] OPTICAL INFORMATION RECORDING MEDIUM

[75] Inventors: Tsutomu Sato, Yokohama; Tatsuya Eida, Tokyo; Keiko Ichinose, Yokohama, all of Japan

[73] Assignee: Ricoh Co., Ltd., Tokyo, Japan

[21] Appl. No.: 878,852

[22] Filed: Jun. 26, 1986

[30] Foreign Application Priority Data

| Jul. 10, 1985 [JP] | Japan | 60-149980 |
| Jan. 23, 1986 [JP] | Japan | 61-11031 |
| Jun. 5, 1986 [JP] | Japan | 61-129096 |

[51] Int. Cl.$^4$ .................... B41M 5/26; G03C 1/72
[52] U.S. Cl. ........................................ 428/64; 428/65; 428/199; 430/281; 430/945; 346/135.1
[58] Field of Search ............... 428/64, 167, 199, 913, 428/65; 430/945, 281; 346/135.1

[56] References Cited

U.S. PATENT DOCUMENTS

| 3,916,069 | 10/1975 | Tiers et al. | 430/338 |
| 4,551,413 | 11/1985 | Bell | 430/945 |
| 4,600,625 | 7/1986 | Abe et al. | 430/945 |

FOREIGN PATENT DOCUMENTS

| 0067092 | 4/1984 | Japan | 428/913 |
| 0226036 | 11/1985 | Japan | 428/913 |
| 0230891 | 11/1985 | Japan | 428/913 |
| 60-05078 | 11/1985 | Japan | 430/945 |
| 0252345 | 12/1985 | Japan | 428/913 |
| 2165658 | 4/1985 | United Kingdom | 430/945 |

*Primary Examiner*—John E. Kittle
*Assistant Examiner*—Beth A. Bozzelli
*Attorney, Agent, or Firm*—Oblon, Fisher, Spivak, McClelland & Maier

[57] ABSTRACT

An optical information recording medium comprises a plastic substrate and a recording layer containing an indole type polymethine compound wherein the substituents attached to N atoms in the indole and indolene rings must be different from each other. The compound provides high solubility in alcoholic solvents, high storage stability (light resistance, heat resistance, etc.) and the like.

18 Claims, No Drawings

OPTICAL INFORMATION RECORDING MEDIUM

BACKGROUND OF THE INVENTION

1. Field of the Invention

This invention relates to an improved optical information recording medium for use in optical recording systems.

2. Description of the Prior Art

As the recording layers used for the optical information recording medium, it has been proposed to use the thin films of organic dyes instead of those of metals such as Al, Te or the like. The thin organic dye films are of the advantages that they are low in melting point, decomposition temperature and heat conductivity, thus providing high densification and sensitivity; they can be formed by coating, thus achieving high mass-productivity at low cost; and they have thermal expansion, water permeability as well as other physical and chemical characteristics which are closed to those of plastic materials used as a substrate, thus reducing crack occurrence of the recording film and deformation by buckling of the plastic substrate.

When the thin organic dye films are formed on the plastic substrate by coating method, however, the problem remains that the plastic substrate is dissolved upon coating by a solvent having a high solubility to plastics, such as acetone, dichloroethane, which are often used as a coating solvent. If the plastic substrate is dissolved even slightly upon coating, the reflectance of the dye film is not increased, thus impairing the advantages of the thin organic dye films are previously mentioned. To overcome the above problem, it can be devised that coating is carried out by using a solvent which has no effect on the substrate. However, there are no dye materials having good storage life which are suitable for coating. Alternatively, there has been proposed a method of providing the recording layer of organic dyes on the substrate with which an underlayer has been provided such as a photopolymer layer. However, the problem remains that additional step of providing the underlayer brings increased cost and reduced productivity of the recording medium.

Further, commercially available injection molded plastic substrate for an optical disc have poor solvent resistance, and only water and alcohols have been used as the solvent which has no effect on the plastic substrate. Moreover, a resistance to environment (including temperature-humidity resistance, storage life) is strictly required for optical recording media, and therefore recording materials must be insoluble in water. From this point of view, there is a pressing need for a recording material which has high solubility in alcoholic solvents, good water resistance and high storage stability (light resistance, heat resistance), when a recording film is formed by coating on the injection molded plastic substrate which is contributive to cost down of the recording medium.

Therefore, it is an object of this invention to provide an optical information recording medium which has high C/N ratio, good storage life and low degradation on read-out and can be produced at low cost. Another object of the invention is to provide a dye compound being soluble in a solvent (e.g., water, alcoholic solvent and a mixed solvent thereof) which has no effect on a plastic substrate. Other objects of the invention will be apparent from the following descriptions.

SUMMARY OF THE INVENTION

In view of the drawbacks of the prior arts as mentioned above, we have studied a large number of dyes and found that indole type cyanine dyes selected from a class of polycyanine dyes are suitable for use in the recording layer of the optical information recording medium. Our further study has accomplished the invention that the stability of indole type cyanine dyes to light and heat can be enhanced by making different a substituent attached to N atom in the indole ring from one attached to N atom in the indolenine ring, i.e., by making N-substituents unsymmetrical.

The objects of this invention can be met by providing an optical information recording medium which comprises a substrate and a recording layer containing at least one of the compounds represented by the formulas (I) and (II).

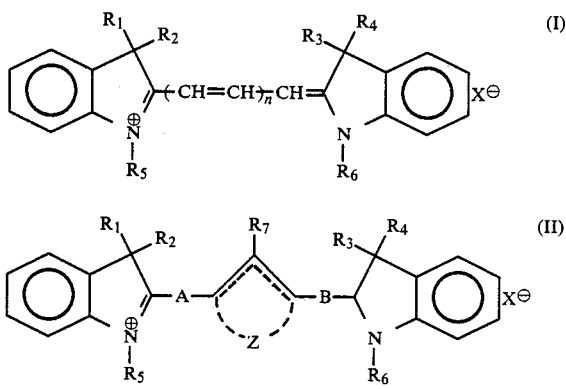

in which $R_1$, $R_2$, $R_3$ and $R_4$ may be the same or different and each is an alkyl group, an alkenyl group, an alkoxy group or an aralkyl group, these groups being optionally substituted;

$R_5$ is an alkyl group having 1 to 3 carbon atoms which is unsubstituted or substituted;

$R_6$ is an alkyl group having 3 to 18 carbon atoms which is unsubstituted or substituted, —$(CH_2)_a$—O—COR or —$(CH_2)_a$—OR where R is an alkyl group of 1 to 3 carbon atoms and a is 1 to 5, with the proviso that when $R_5$ is $C_3$ alkyl, $R_6$ is not $C_3$ alkyl;

$R_7$ is hydrogen, an alkyl group, an alkenyl group, an alkoxy group, a hydroxyl group, a halogen atom, an unsubstituted or substituted amino group, an alkanoyloxy group or an aralkyl group;

Z represents atom groups necessary to form 4 to 8-membered rings, preferably 5- or 6-membered ring, which are unsubstituted or substituted and may be condensed with an aromatic ring; A is $+(CH=CH)_1$ or $+CH=CH-CH)_1$; B is $+CH-CH)_m$ or $+CH=CH)_m CH=$; m and l is 0 or 1 3, and n is 2 or 3; and X is an acid anion, its preferred examples including $I^{\ominus}$, $Br^{\ominus}$, $Cl^{\ominus}$, $ClO_4^{\ominus}$, $BF_4^{\ominus}$ and $SbF_6^{\ominus}$.

In the formulas (I) and (II),

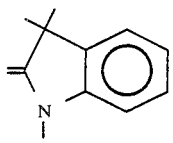

shows a radical of the indole ring and

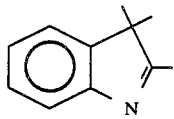

shows a radical of the indolenine ring, both radicals being tautomerism. The benzene nuclei in the indole and indolenine rings may be substituted by one or more groups selected from an alkyl group, an alkenyl group, an alkoxy group, a halogen atom, or an aralkyl group, or may be condensed with one or more benzene rings to form benzoindole or naphthoindole for example.

In the above formulae, the dotted line in the unit of

indicates the possibility of a single bond or a double bond, depending on kind of A attached to said unit. For instance, when A is —CH=, the unit is

whereas the unit is

when A is —CH=CH—.

DETAILED DESCRIPTION OF THE INVENTION

The recording layer of the present invention comprises at least one of the compounds represented by the formulae (I) and (II). These compounds are characterized by the substituents attached to N atoms in the indole and indolene rings. More particularly, the substituents $R_5$ and $R_6$ must be different from each other. $R_5$ is an unsubstituted or substituted $C_1$-$C_3$ alkyl, whereas $R_6$ is an unsubstituted or substituted $C_3$-$C_{18}$ alkyl, —(CH$_2$)$_a$—OCOR or —(CH$_2$)$_a$—OR where R is $C_1$-$C_3$ alkyl and a is 1 to 5. When $R_5$ is taken from $C_3$ alkyl, $R_6$ must not be taken from $C_3$ alkyl. It is assumed that such characteristics of the dye compounds provide high solubility in alcoholic solvents, high storage stability (light resistance, heat resistance, etc.) and the like.

Typical examples of the present compounds are listed below by the formulae.

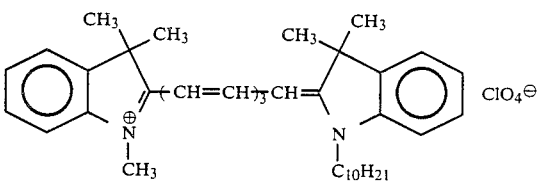 (1)

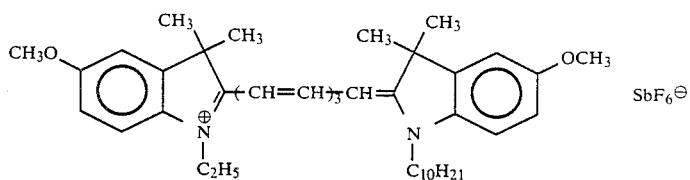 (2)

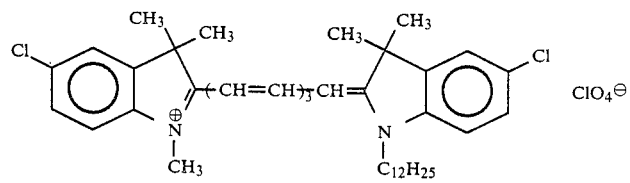 (3)

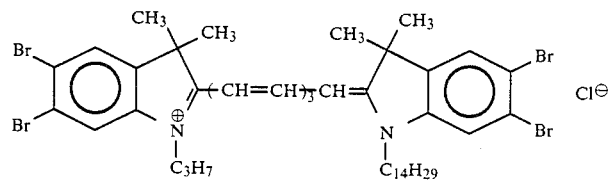 (4)

-continued
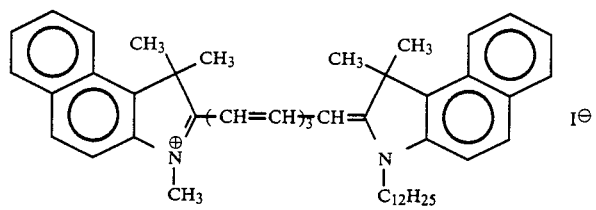 (5)
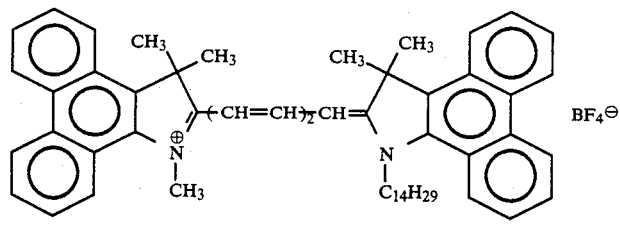 (6)
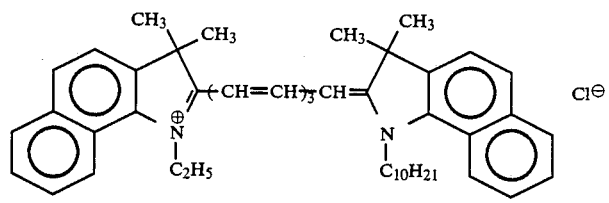 (7)
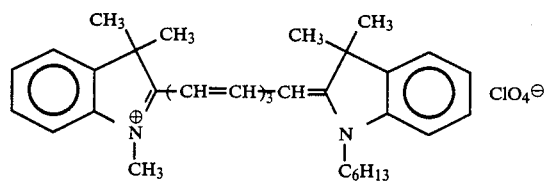 (8)
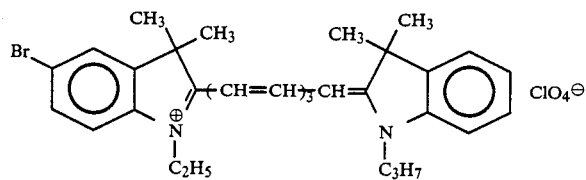 (9)
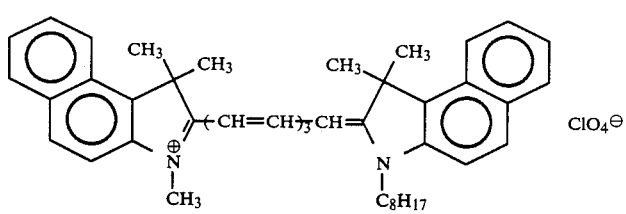 (10)
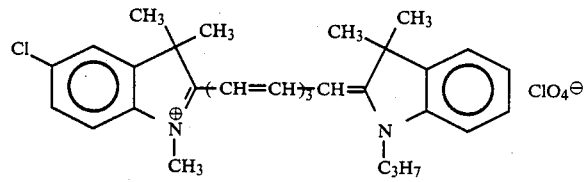 (11)
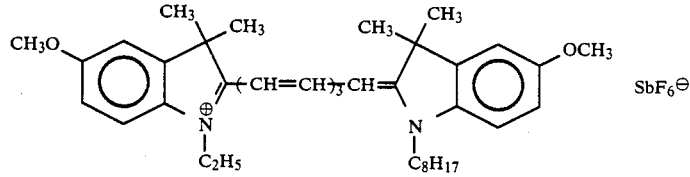 (12)

-continued
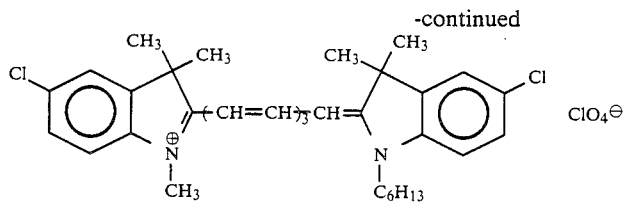 (13)
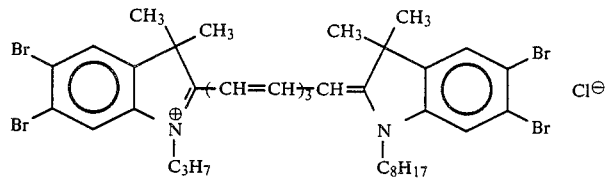 (14)
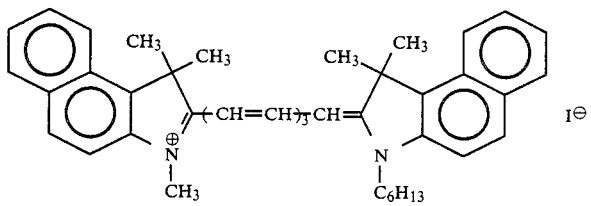 (15)
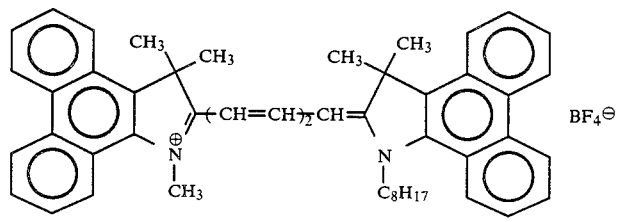 (16)
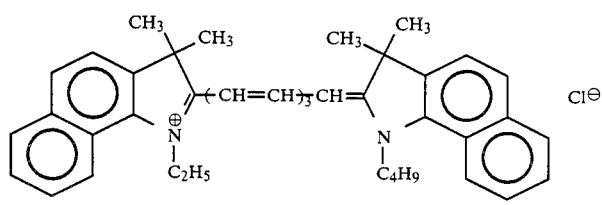 (17)
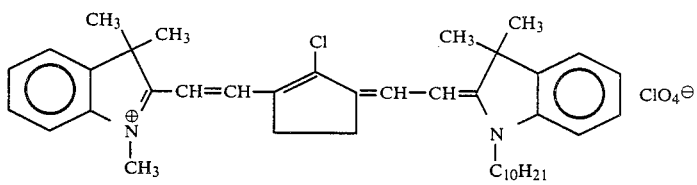 (18)
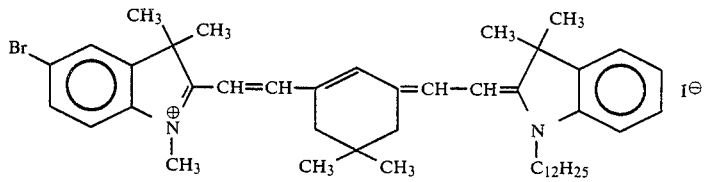 (19)
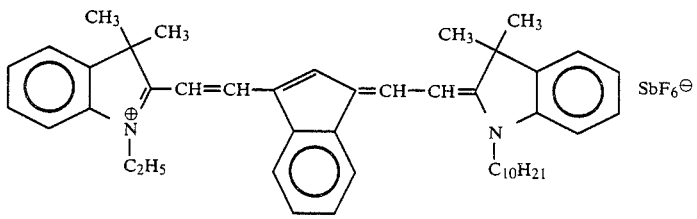 (20)

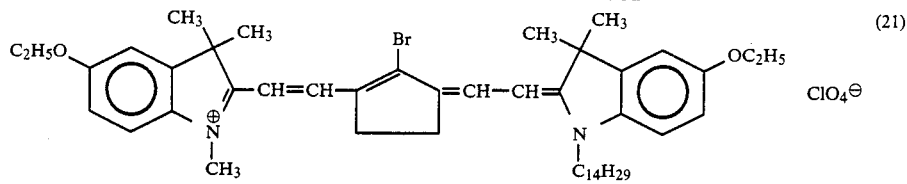
(21)
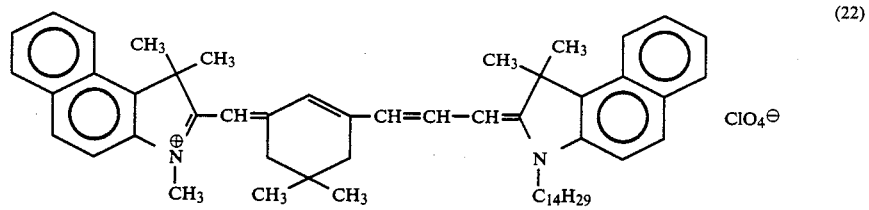
(22)
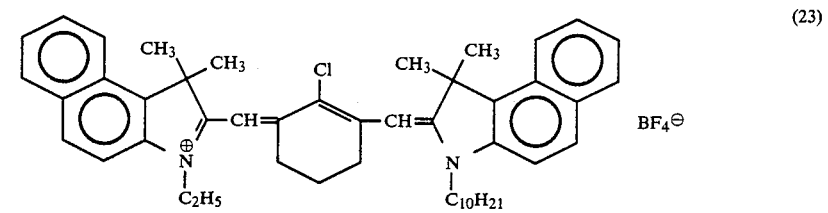
(23)
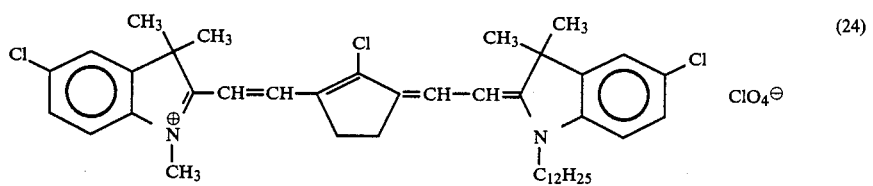
(24)
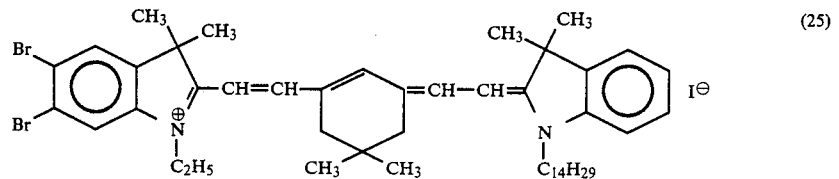
(25)
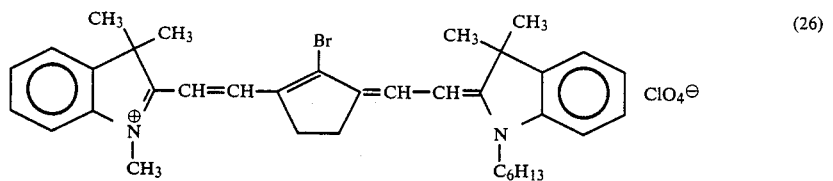
(26)
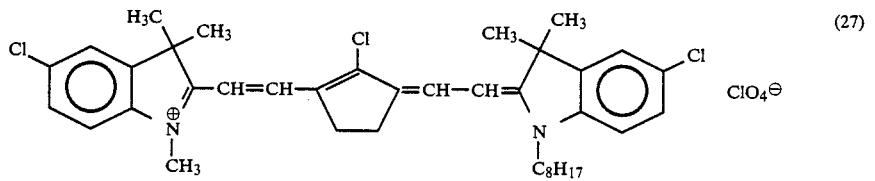
(27)
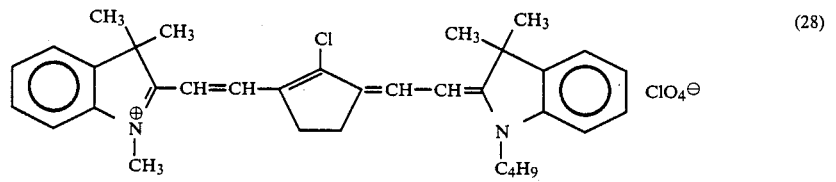
(28)

-continued
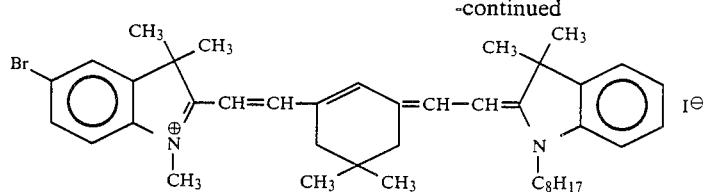 (29)
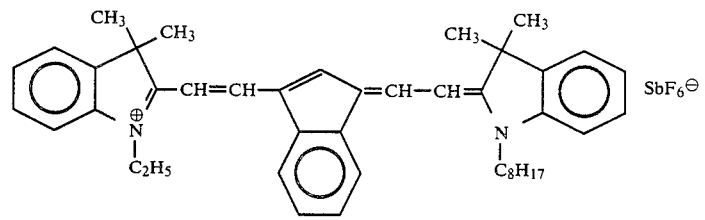 (30)
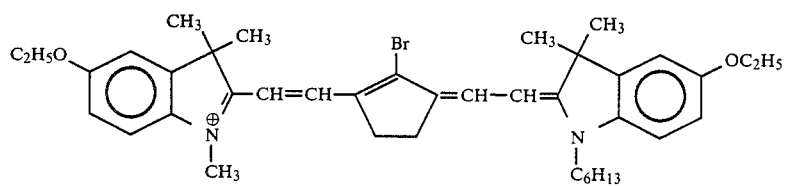 (31)
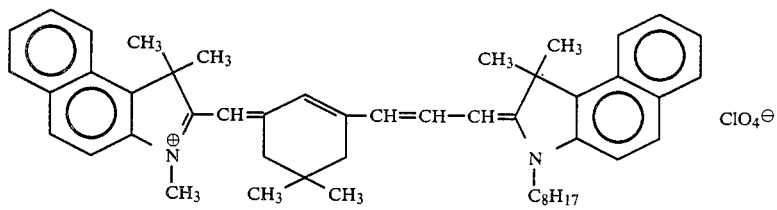 (32)
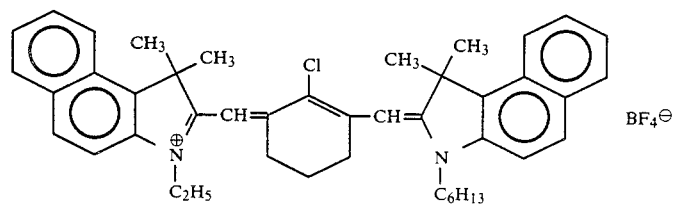 (33)
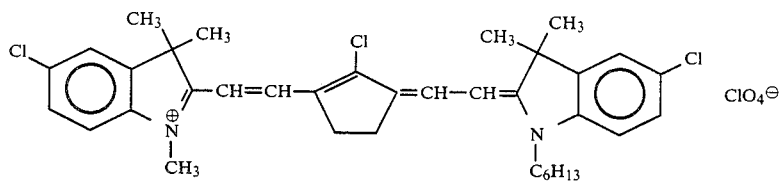 (34)
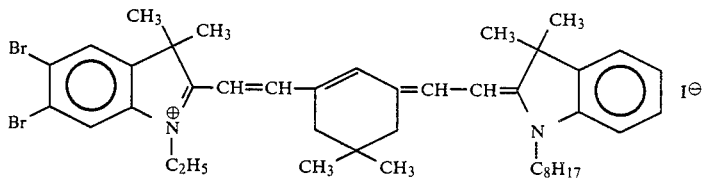 (35)
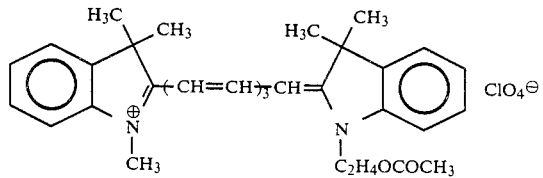 (36)

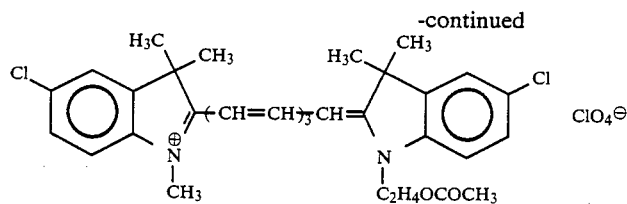 (37)
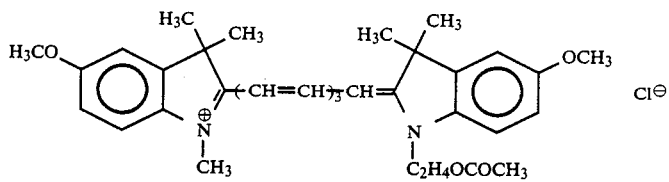 (38)
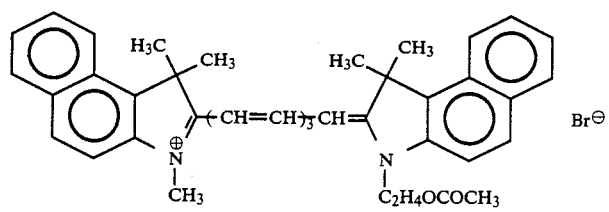 (39)
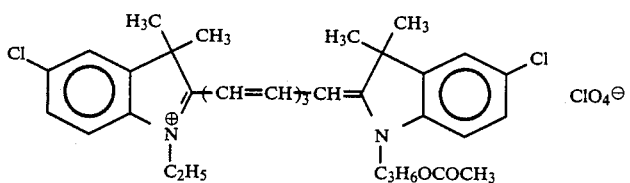 (40)
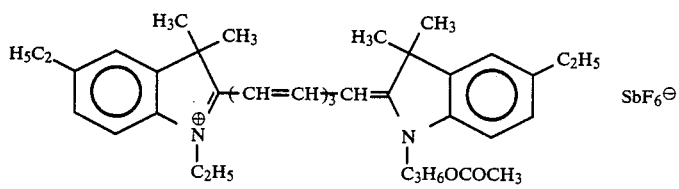 (41)
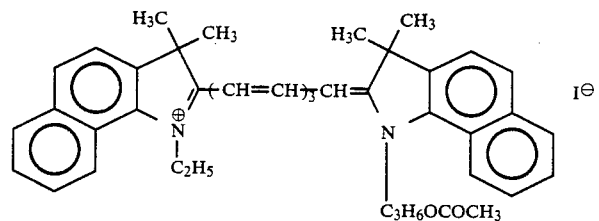 (42)
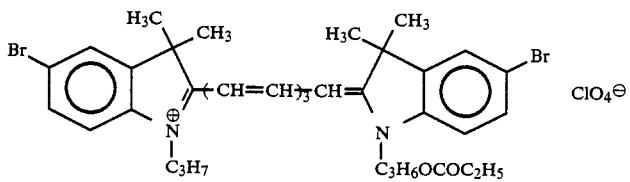 (43)
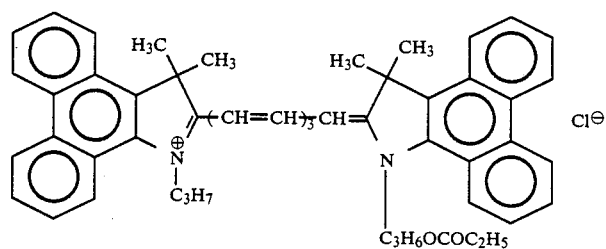 (44)

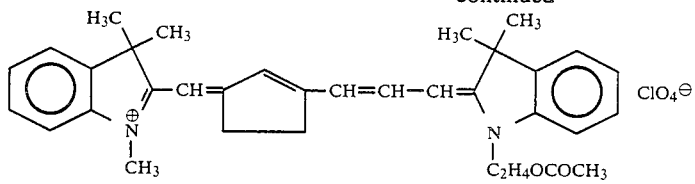
(45)
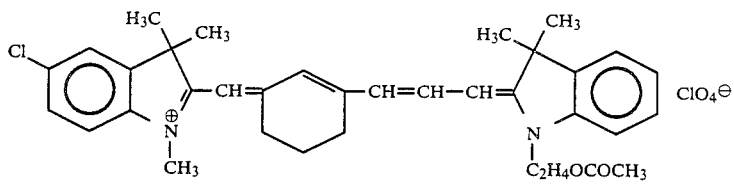
(46)
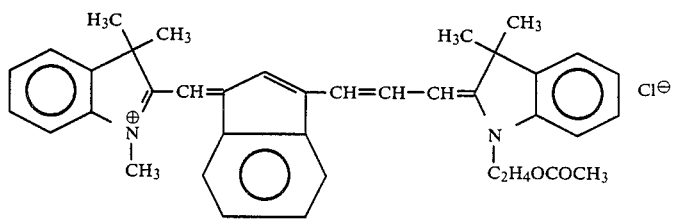
(47)
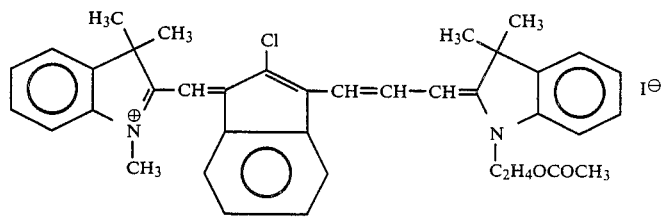
(48)
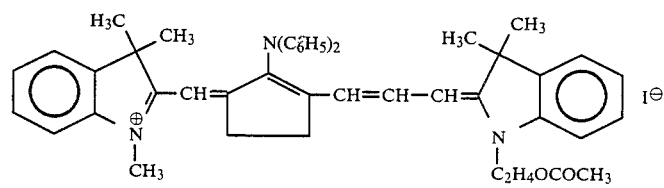
(49)
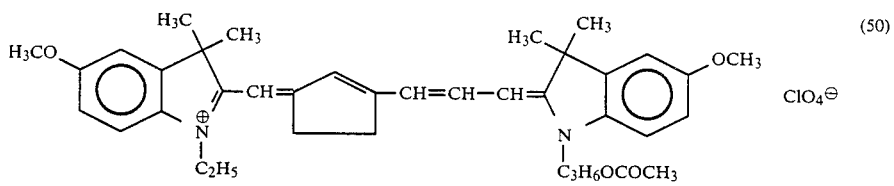
(50)
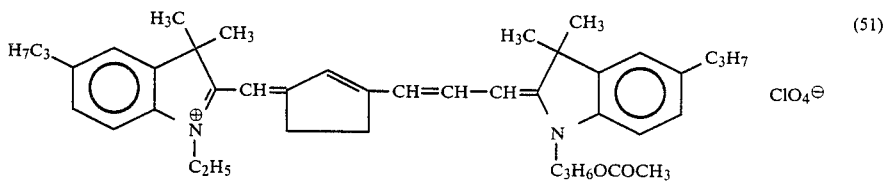
(51)
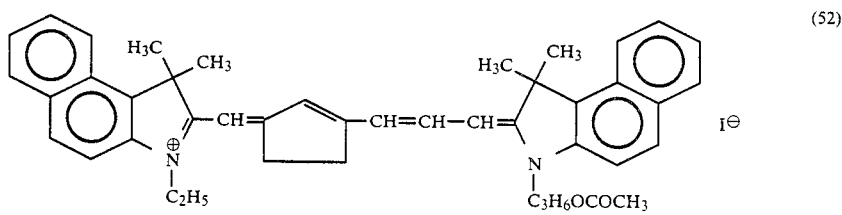
(52)

-continued
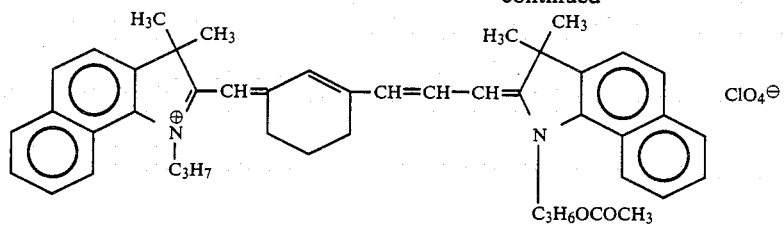 (53)
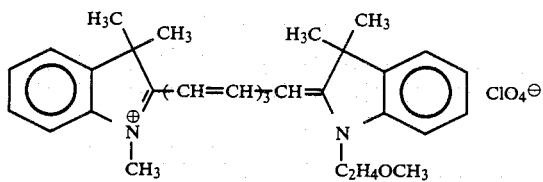 (54)
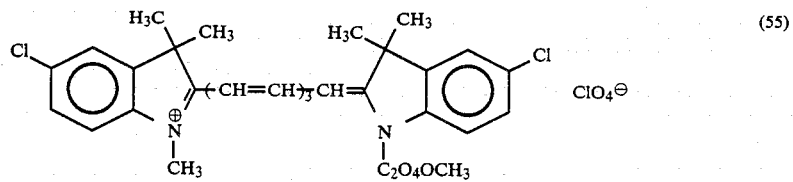 (55)
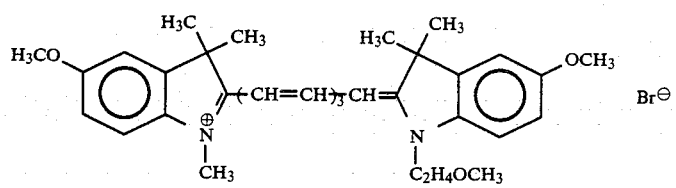 (56)
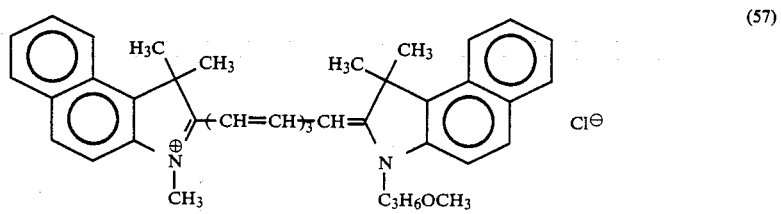 (57)
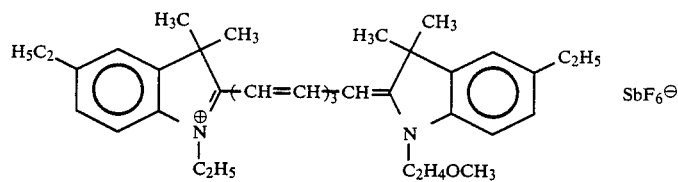 (58)
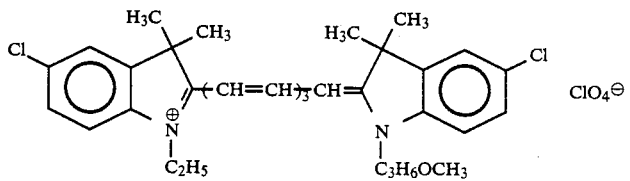 (59)
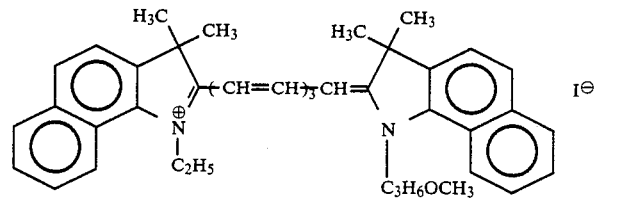 (60)

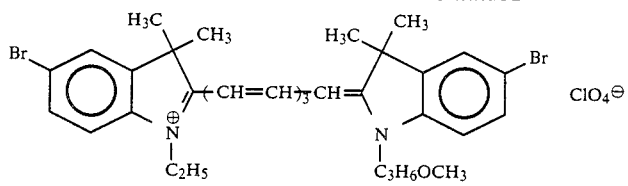 (61)
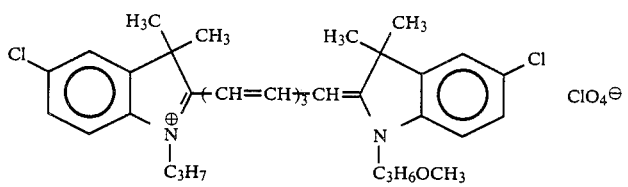 (62)
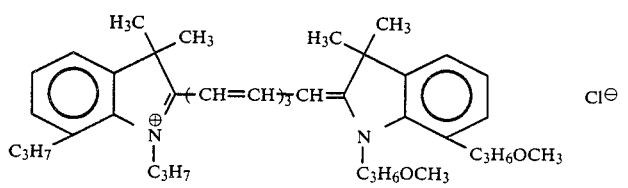 (63)
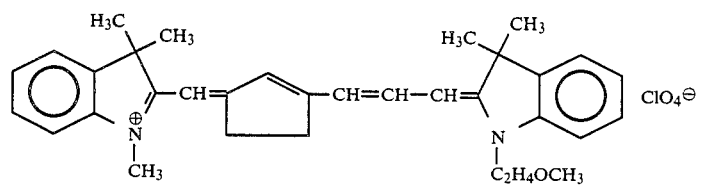 (64)
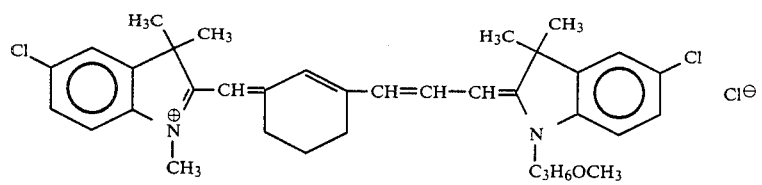 (65)
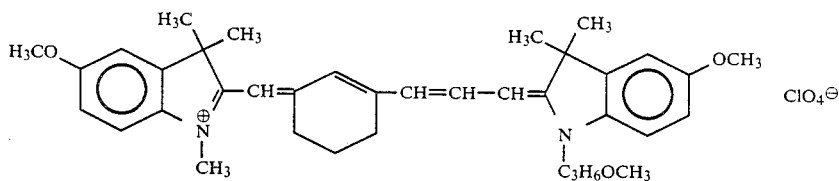 (66)
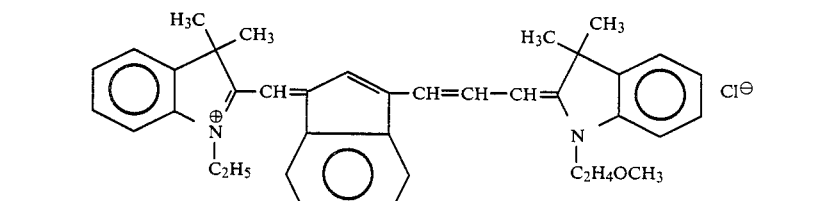 (67)
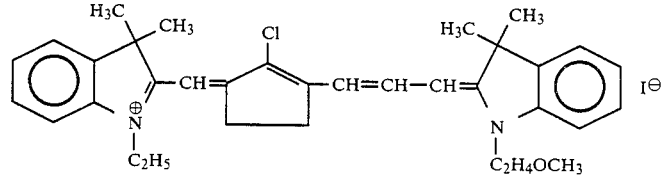 (68)

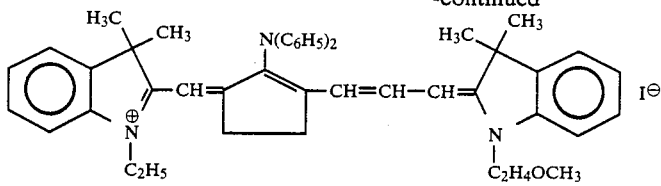 (69)

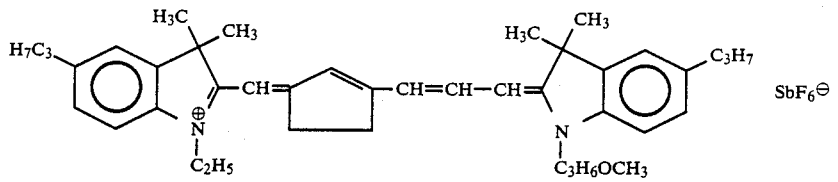 (70)

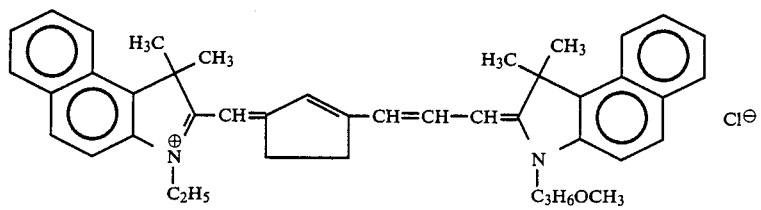 (71)

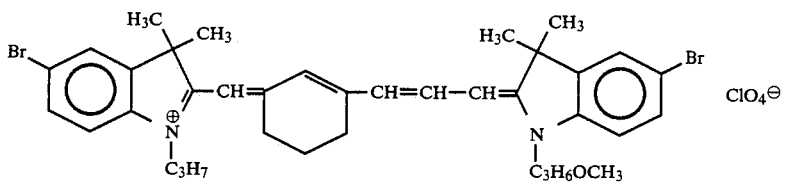 (72)

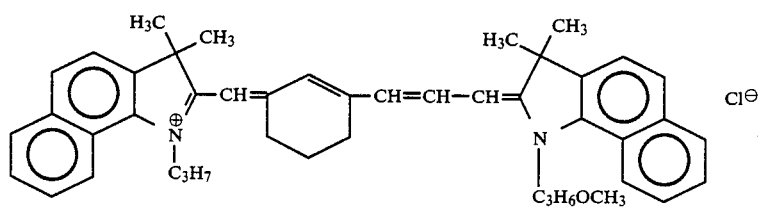 (73)

The recording layer in the present invention is composed essentially of at least one of the dye compounds represented by the formulae (I) and (II). The dye compound can be contained in the recording layer in the proportion of 50 to 100% by weight based on the total solids of said recording layer, and preferably 70 to 98% by weight. Other dyes and a stabilizer may be contained to enhance recording characteristics and stability of the recording medium. Examples of other dyes include phthalocyanine, tetrahydrocollin, dioxazine, triphenothiazine, phenanthrene, polymethine (cyanine, merocyanine), anthraquinone (indanthrene), Xanthene, triphenylmethane, croconium, azulene, pyrylium, squalium, naphthoquinone and the like.

Any stabilizers can be used in the recording layer, but metal complex compounds, aminium compounds and triphenylamine compounds are preferred because of their providing enhanced stability and light resistance and being well compatible with the dye compounds of the present invention. Examples of these metal complex compounds are disclosed in Japanese Patent LOP Publn. No. 55795/1984 and include acetylacetonate chelates, bisdithio-α-diketones, bisphenyl dithiols, salicylaldehyde oximes, thiobisphenolate chelates and the like, which contain Ni, Co, Cu, Mn, etc., as a center metal. Of these compounds are preferable bisdithio-α-diketones and bisphenyl dithiols.

Examples of the aminium compounds, as disclosed in our copending Japanese Patent Applications No. 18222/1984 and No. 91922/1984, include the compounds of the following formula.

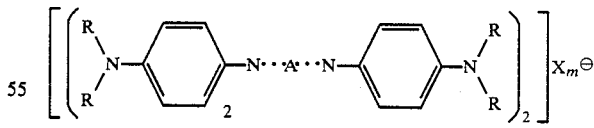

in which R is hydrogen or lower alkyl, X is acid anion, m is 0, 1 or 2, A is

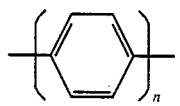

(n=1 or 2) or

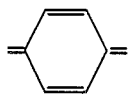

(when m=2), and all of the aromatic nuclei may be substituted with lower alkyl, lower alkoxy, halogen or hydroxyl.

Examples of the triphenylamine compounds, as disclosed in our copending Japanese Patent Application No. 242974/1985, include the compounds of the following formula.

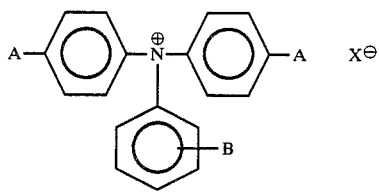

in which A is phenyl, cyclohexylamino, dibenzylamino or dialkylamino having $C_1$–$C_4$ alkyl, B is H or the same as A, X is acid anion and all of the aromatic nuclei may be substituted with lower alkyl, alkoxy, lower alkylthio, halogen or hydroxyl.

The stabilizer may be contained in the recording layer in the proportion of usually about 0.02 to 1 mole and preferably about 0.05 to 0.3 mole per one mole of the dye compound of the present invention. To the recording layer may be added binders, dispersing agents, flame retardars, lubricants, antistatic agents, plasticizers and the like if desired.

The recording layer can be formed by coating. The thickness of the coated film is from 100 to 5000 Å, preferably 200 to 1500 Å and most preferably 400 to 800 Å. Less than 100 Å provides such low level of absorption that cannot record. More than 5000 Å provides a lowering of recording density and increase in noise. Coating can be carried out by spray, blade, spinning, roller, and the like. In the coating practice of the present invention, there can be employed a solvent which has no effect on the plastic substrate used in the invention. Therefore, the use of the solvent may save the trouble of subjecting the substrate to insolubilization treatment (e.g., underlayer, electromagnetic radiation). This does not mean a positive elimination of an underlayer provided on the substrate. The solvent can include water, an alcoholic solvent, e.g., methanol, ethanol, and a mixed solvent of the alcoholic solvent with other solvents, e.g., methanol/acetone. When the mixed solvent is used, it is suitable that the alcoholic solvent is mixed with up to 50% (preferably up to 30%) of other solvents.

The substrate materials used in the present invention may be those well known in this field and may be either transparent or opaque to the laser beam used. The substrate materials include glass, quartz, ceramics, paper, plate-like or foil-like metal and the like. When writing is effected from the side of the substrate, however, the substrate material must be transparent to the laser beam. On the other hand, when writing is effected from the side opposite to the substrate, i.e., from the surface of the recording layer, there is no need that the substrate material should be transparent to the laser beam.

It is preferable that the plastic substrate is molded by injection from the viewpoint of its productivity and cost. Typical plastics used for the substrate include acrylic resin such as polymethylmethacrylate (PMMA), polycarbonate, polymethylpentene and the like but not limiting thereto. Preformat for address signals and pregroove for track guide may be formed on the surface of the substrate. The substrate may be formed in any shape of tape, disc, drum, belt and the like depending on the application.

The optical information recording medium of the present invention is composed essentially of the substrate and the recording layer, but a protective layer may be provided on the recording layer as occasion demands. The thickness of the protective layer is in the range of about 0.1 to 30 μm, and preferably about 0.2 to 10 μm. For the purpose of protecting the recording layer from crack, dusts, stains, etc., as the materials of the protective layer can be used high polymers such as vinyl resins, polyamides, natural rubbers, ionomers; inorganic compounds such as $SiO_2$, $MgF_2$, SiO, $TiO_2$, ZnO, TiN, SiN; metals and semimetals such as Zn, Cu, S, Ni, Cr, Ge, Se, Al, Ag. For the purpose of providing improved reflectance of the recording medium, there can be used the above-mentioned metals or semimetals or thin organic films having a metal luster such as those of methine and Xanthen dyes.

The recording layer in the present invention may be provided on either or both surfaces of the substrate to form a recording medium. Further, a pair of this recording medium may be laminated and sealed through a space while arranging the recording layer on the inside to assemble a recording medium having a sandwich structure so that the recording layer can be protected from dusts and cracks. A protective cover sheet formed of the substrate materials may also be laminated over the recording layer in the pair of the recording medium.

In the optical information recording media of the present invention, information is written by physical change in the state of the recording layer (pit formation) caused by interaction of light and heat through radiation of laser beams for writing. On the other hand, information is read out by detecting the reflectance of the recording layer through radiation of a laser light for read-out.

As the light for writing and read-out can be employed a semi-conductor laser emitting at 750–850 nm, and the like.

According to the present invention, there can be prepared the recording media having less degradation on read-out and better storage stability than those of the prior art recording media. Also, the recording media of the present invention are of the advantages that the recording layer can be coated directly on the injection-molded plastic substrate, thus achieving great reduction in manufacturing cost.

This invention will be further illustrated by the following Examples which are given for illustration purpose only and not for limiting the scope of the invention.

EXAMPLE 1

On the injection-molded polymethylmethacrylate (PMMA) having 1.2 mm thickness, 35 mmφ I/D and 200 mmφ O/D, on the surface of which there are provided the grooves with the areas ranging from 92 mmφ to 187 mmφ, 900 Å depth, 0.4 μm half-value width and 1.6 μm pitch, was coated by spinning a solution of 1% by weight of the above-listed dye compound (1) dissolved in methanol to form a recording layer with the coated thickness of about 550 Å.

EXAMPLE 2

The recording medium was prepared by the same procedure as mentioned in Example 1, but using the above-listed compound (3) as a dye compound.

EXAMPLE 3

The recording medium was prepared by the same procedure as mentioned in Example 1, but using the above-listed compound (5) as a dye compound.

EXAMPLE 4

The recording medium was prepared by the same procedure as mentioned in Example 1, but using the above-listed compound (18) as a dye compound.

EXAMPLE 5

The recording medium was prepared by the same procedure as mentioned in Example 1, but using the above-listed compound (24) as a dye compound.

EXAMPLE 6

The recording medium was prepared by the same procedure as mentioned in Example 1, but using a mixture of the above-listed compound (1) and the above-listed compound (28) (7:3 weight ratio) as a dye compound.

EXAMPLE 7

The recording medium was prepared by the same procedure as mentioned in Example 1, but adding to the compound (1) used in Example 1 the nickel complex of the following formula.

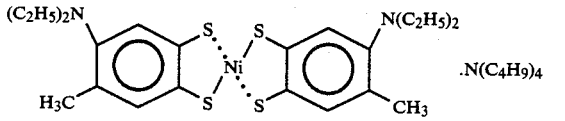

EXAMPLE 8

The recording medium was prepared by the same procedure as mentioned in Example 7, but replacing the nickel complex of Example 7 with the compound of the following formula.

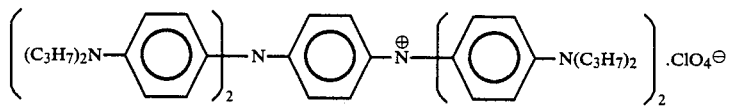

EXAMPLE 9

On the injection-molded polycarbonate substrate having the same size and grooves as mentioned in Example 1 was coated by spinning a solution of 1% by weight of the above-listed compound (37) in methanol-/acetone (85/15) to form a recording layer with the coated thickness of about 550 Å.

EXAMPLE 10

The recording medium was prepared by the same procedure as mentioned in Example 9, but using the above-listed compound (40) as a dye compound.

EXAMPLE 11

The recording medium was prepared by the same procedure as mentioned in Example 9, but using the above-listed compound (43) as a dye compound.

EXAMPLE 12

The recording medium was prepared by the same procedure as mentioned in Example 9, but using the above-listed compound (50) as a dye compound.

EXAMPLE 13

The recording medium was prepared by the same procedure as mentioned in Example 9, but using as the substrate the same PMMA substrate as in Example 1 and using the above-listed compound (36) as a dye compound.

EXAMPLE 14

The recording medium was prepared by the same procedure as mentioned in Example 9, but adding to the above-listed compound (37) 5% by weight of the nickel complex having the following formula.

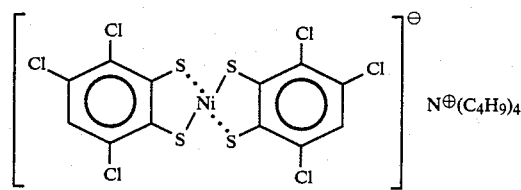

EXAMPLE 15

The recording medium was prepared by the same procedure as mentioned in Example 9, but adding to the above-listed compound (37) 10% by weight of the aminium salt having the following formula

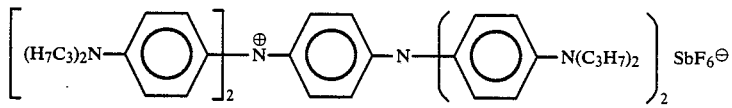

EXAMPLE 16

The recording medium was prepared by the same procedure as mentioned in Example 10, but adding to the above-listed compound (40) 10% by weight of the triphenylamine compound having the following formula.

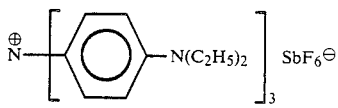

EXAMPLE 17

The recording medium was prepared by the same procedure as mentioned in Example 9, but using the above-listed compound (45) as a dye compound.

EXAMPLE 18

The recording medium was prepared by the same procedure as mentioned in Example 17, but adding 10% by weight of the triphenylamine compound used in Example 17.

EXAMPLE 19

The recording medium was prepared by the same procedure as mentioned in Example 9, but using as a dye compound a 1:1 mixture of the above-listed compound (37) and the above-listed compound (45).

EXAMPLE 20

The recording medium was prepared by the same procedure as mentioned in Example 19, but adding 15% by weight of the same nickel complex as in Example 15.

EXAMPLE 21

On the same polycarbonate substrate as used in Example 9 was coated by spinning a solution of 1% by weight of the above-listed compound (1) dissolved in methanol/Methyl Cellosolve (85/15) to form a recording layer with the coated thickness of about 550 Å.

EXAMPLE 22

The recording medium was prepared by the same procedure as mentioned in Example 21, but using the above-listed compound (2) as a dye compound.

EXAMPLE 23

The recording medium was prepared by the same procedure as mentioned in Example 21, but using the above-listed compound (8) as a dye compound.

EXAMPLE 24

The recording medium was prepared by the same procedure as mentioned in Example 21, but using the above-listed compound (9) as a dye compound.

EXAMPLE 25

The recording medium was prepared by the same procedure as mentioned in Example 21, but using the above-listed compound (11) as a dye compound.

EXAMPLE 26

The recording medium was prepared by the same procedure as mentioned in Example 21, but using the above-listed compound (15) as a dye compound.

EXAMPLE 27

The recording medium was prepared by the same procedure as mentioned in Example 21, but using PMMA as a substrate and using as a dye solution a solution of the above-listed compound (10) (1% by weight) dissolved in methanol/1,2-dichloroethane (90/10).

EXAMPLE 28

The recording medium was prepared by the same procedure as mentioned in Example 21, but adding to the above-listed compound (2) 5% by weight of the nickel complex having the following formula.

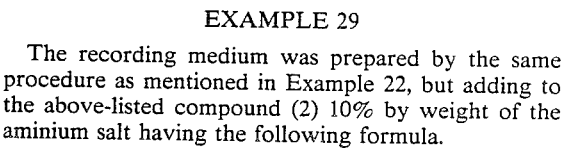

EXAMPLE 29

The recording medium was prepared by the same procedure as mentioned in Example 22, but adding to the above-listed compound (2) 10% by weight of the aminium salt having the following formula.

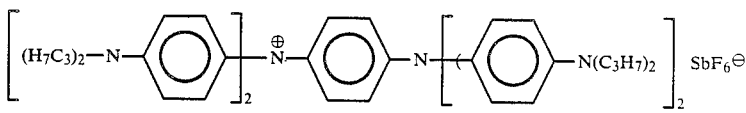

EXAMPLE 30

The recording medium was prepared by the same procedure as mentioned in Example 22, but adding to the above-listed compound (2) 10% by weight of the triphenylamine compound having the following formula.

EXAMPLE 31

On the recording layer prepared in Example 9 was coated in 0.5 μm thickness a carbon tetrachloride solution (5%) of an ethylene-vinyl acetate copolymer (EV-150) to provide a protective layer.

EXAMPLE 32

On the same substrate as used in Example 9 was coated by spinning a solution of 1% by weight of the above-listed compound (11)/polyvinyl butyral (BT-60, Hoechst A.G.) (8/12 weight ratio) dissolved in a mixed solvent of methanol/1,2-dichloroethane (85/15) to form a recording layer with the coated thickness of about 600 Å.

EXAMPLE 33

The recording medium was prepared by the same procedure as mentioned in Example 9, but replacing the above-listed compound (11) by the above-listed compound (55).

EXAMPLE 34

The recording medium was prepared by the same procedure as mentioned in Example 9, but replacing the above-listed compound (11) by the above-listed compound (61).

EXAMPLE 35

The recording medium was prepared by the same procedure as mentioned in Example 33, but adding to the above-listed compound (55) 10% by weight of the aminium salt used in Example 15.

COMPARATIVE EXAMPLE 1

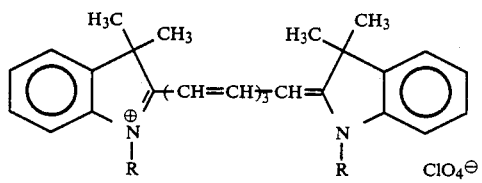

The compounds of the above formula wherein R is independently $CH_3$, $C_2H_5$ or $C_3H_7$ were respectively tried to dissolve in methanol. However, no coating solution could be prepared, because those compounds have poor solubility in methanol.

COMPARATIVE EXAMPLE 2

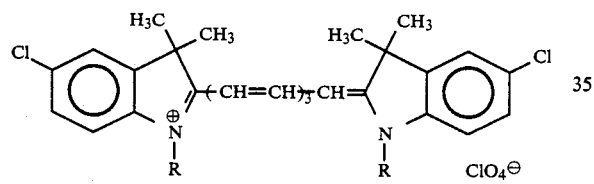

The compounds of the above formula wherein R is independently $CH_3$ or $C_2H_5$ were respectively tried to dissolve in methanol. However, no coating solution could be prepared, because those compounds are slightly soluble in methanol.

COMPARATIVE EXAMPLE 3

A solvent having so high solubility as to prepare a coating solution, i.e., a mixed solvent of methanol/1,2-dichloroethane (30/70) was used for the compounds of Comparative Example 2, whereupon a plastic substrate was dissolved with the result of complete disappearance of the grooves.

COMPARATIVE EXAMPLE 4

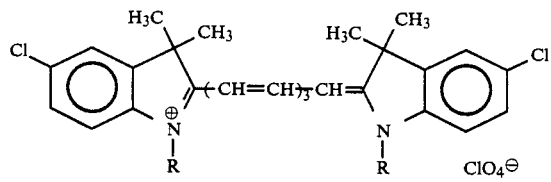

The compounds of the above formula wherein R is independently $CH_3$ OR $C_2H_5$ were respectively tried to dissolve in the proportion of 1% by weight in a mixed solvent of methanol/acetone (85/15). However, no recording layer could be formed, because those compounds are insoluble in the solvent.

COMPARATIVE EXAMPLE 5

The recording medium was prepared by the same procedure as mentioned in Example 1, but using as a dye compound a compound of the following formula.

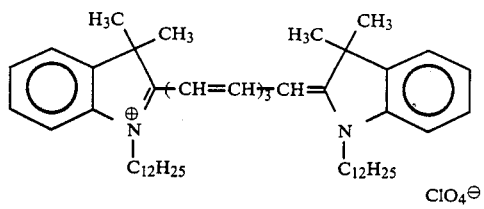

COMPARATIVE EXAMPLE 6

The recording medium was prepared by the same procedure as mentioned in Example 1, but using as a dye compound a compound of the following formula.

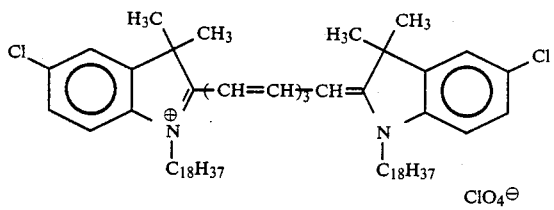

COMPARATIVE EXAMPLE 7

The recording medium was prepared by the same procedure as mentioned in Example 10, but using as a dye compound a compound of the following formula.

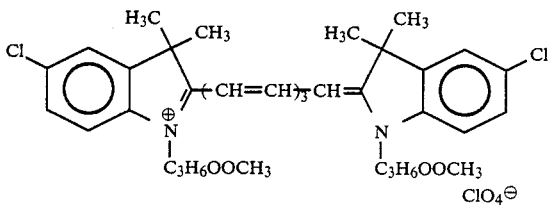

COMPARATIVE EXAMPLE 8

The recording medium was prepared by the same procedure as mentioned in Example 1, but using as a dye compound a compound of the following formula.

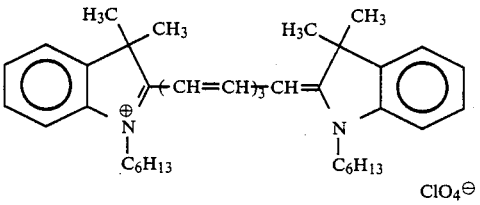

COMPARATIVE EXAMPLE 9

The recording medium was prepared by the same procedure as mentioned in Example 1, but using as a dye compound a compound of the following formula.

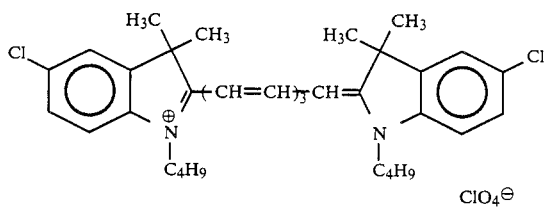

COMPARATIVE EXAMPLE 10

The recording medium was prepared by the same procedure as mentioned in Comparative Example 9, but adding to the compound used therein the aminium salt used in Example 30.

Recording characteristics and aging behaviour were determined for the recording media prepared in Examples 1–36 and Comparative Examples 1–10. The writing was carried out using a semi-conductor laser emitting at 790 nm, with the beam diameter of 1.6 μm, linear velocity of 1.5 m/sec, and writing power of 2.7 mW, whereby a signal of 0.7 MHz was written into the recording media. The read-out was conducted by the same laser. Then, the reflectance and C/N ratio (carrier-to-noise ratio) were measured for each recording medium. The measurement of C/N ratio was carried out by spectral analysis (scanning filter 30 KHz) of reflected light. The reflectance was measured from the side of the substrate.

Subsequently, the recording media were subjected to the accelerated aging test in which the media were stored in thermo-hygrostat at 60° C. and 90% R.H. for 1000 hours. Further, the recording media were subjected to the accelerated read-out degradation test in which the media were irradiated with tungsten light of 1000 W/m² intensity for 12 hours from the distance 20 cm. The reflectance and C/N ratio were measured after the accelerated aging and read-out degradation tests. The results as measured are shown in the table below.

|  | Initial | | After the accelerated aging test | | After the accelerated read-out degradation test | |
| --- | --- | --- | --- | --- | --- | --- |
|  | Reflectance (%) | C/N (dB) | Reflectance (%) | C/N (dB) | Reflectance (%) | C/N (dB) |
| Example |  |  |  |  |  |  |
| 1 | 27.2 | 53 | 23.2 | 51 | 18.8 | 48 |
| 2 | 26.8 | 52 | 23.8 | 50 | 19.3 | 49 |
| 3 | 28.4 | 53 | 25.2 | 51 | 19.7 | 48 |
| 4 | 27.9 | 53 | 24.9 | 51 | 18.3 | 47 |
| 5 | 27.8 | 52 | 25.6 | 51 | 17.9 | 47 |
| 6 | 26.6 | 53 | 25.7 | 51 | 16.7 | 47 |
| 7 | 25.9 | 52 | 22.8 | 49 | 23.2 | 50 |
| 8 | 26.3 | 51 | 23.2 | 49 | 23.6 | 49 |
| 9 | 26.7 | 58 | 24.3 | 56 | 14.1 | 44 |
| 10 | 27.1 | 57 | 25.5 | 55 | 13.8 | 44 |
| 11 | 25.9 | 57 | 23.9 | 55 | 13.3 | 43 |
| 12 | 26.3 | 58 | 24.1 | 56 | 15.7 | 45 |
| 13 | 26.6 | 57 | 25.5 | 54 | 13.9 | 43 |
| 14 | 26.2 | 56 | 24.6 | 54 | 19.8 | 54 |
| 15 | 25.9 | 55 | 23.8 | 54 | 22.3 | 54 |
| 16 | 26.3 | 56 | 23.9 | 54 | 22.1 | 55 |
| 17 | 25.3 | 55 | 22.8 | 54 | 13.7 | 42 |
| 18 | 24.6 | 56 | 21.9 | 53 | 22.1 | 53 |
| 19 | 26.3 | 56 | 23.8 | 54 | 14.0 | 43 |
| 20 | 25.8 | 56 | 23.6 | 54 | 22.8 | 53 |
| 21 | 27.3 | 53 | 24.2 | 51 | 13.1 | 40 |
| 22 | 27.8 | 53 | 24.6 | 51 | 14.4 | 41 |
| 23 | 26.9 | 53 | 23.8 | 51 | 13.7 | 40 |
| 24 | 24.8 | 51 | 22.9 | 49 | 12.3 | 38 |
| 25 | 26.6 | 53 | 24.4 | 51 | 14.7 | 42 |
| 26 | 27.0 | 53 | 24.7 | 51 | 13.2 | 40 |
| 27 | 25.3 | 52 | 22.2 | 49 | 12.0 | 36 |
| 28 | 26.9 | 52 | 23.9 | 50 | 19.4 | 48 |
| 29 | 26.5 | 51 | 23.7 | 50 | 22.1 | 50 |
| 30 | 26.3 | 52 | 23.0 | 49 | 23.3 | 50 |
| Comparative Example |  |  |  |  |  |  |
| 1 | Not determined | — | — | — | — | — |
| 2 | Not determined | — | — | — | — | — |
| 3 | Not determined | — | — | — | — | — |
| 4 | Not determined | — | — | — | — | — |
| 5 | 26.8 | 53 | 23.9 | 50 | 10.2 | 39 |
| 6 | 26.3 | 53 | 23.8 | 50 | 8.9 | 35 |
| 7 | 25.7 | 54 | 21.0 | 48 | 13.6 | 43 |
| 8 | 26.2 | 53 | 21.0 | 49 | 10.2 | 30 |
| 9 | 26.6 | 53 | 20.8 | 48 | 10.6 | 30 |
| 10 | 26.2 | 52 | 20.0 | 47 | 18.6 | 47 |

As mentioned hereinabove, the compounds represented by the formulas (I) and (II) according to the present invention are new as a recording material for use in the optical information recording medium. Having described the present invention as related to the application of the recording layer containing at least one of the above-mentioned compounds to the plastic substrate without the underlayer, it is our intention that said recording layer can be applied to the substrates with which an underlayer is provided.

What is claimed is:

1. An optical information recording medium which comprises a substrate and a recording layer at least 100 Å thick, containing at least one of the compounds represented by the formulas (I) and (II)

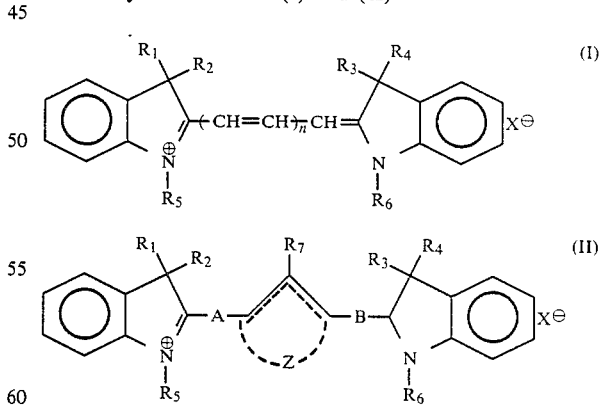

in which

R₁, R₂, R₃ and R₄ may be the same or different and each is an alkyl group, an alkenyl group, an alkoxy group or an aralkyl group, these groups being optionally substituted;

R₅ is an alkyl group having 1 to 3 carbon atoms which is unsubstituted or substituted;

R$_6$ is an alkyl group having 3 to 18 carbon atoms which is unsubstituted or substituted, —(CH$_2$)$_a$—OCOR or —(CH$_2$)$_a$—OR where R is an alkyl group of 1 to 3 carbon atoms and a is 1 to 5, with the proviso that when R$_5$ is C$_3$ alkyl, R$_6$ is not C$_3$ alkyl;

R$_7$ is hydrogen, an alkyl group, an alkenyl group, an alkoxy group, a hydroxyl group, a halogen atom, an unsubstituted or substituted amino group, an alkanoyloxy group or an aralkyl group;

Z represents atom groups necessary to form 4 to 8-membered rings, preferably 5- to 6-membered ring, which are unsubstituted or substituted and may be condensed with an aromatic ring;

A is $+CH=CH+_1$ or $-CH=CH-CH=_1$;

B is $=CH-CH=_m$ or $+CH=CH+_mCH=$;

m and 1 is 0 or 1 to 3, and n is 2 or 3; and

X is an acid anion, and the benzene nuclei in the indole and indolenine rings may be substituted by one or more groups selected from an alkyl group, an alkenyl group, an alkoxy group, a halogen atom or an aralkyl group, or may be condensed with one or more benzene rings.

2. A recording medium of claim 1 wherein R$_5$ is unsubstituted C$_1$-C$_3$ alkyl and R$_6$ is unsubstituted C$_3$-C$_{18}$ alkyl with the proviso that R$_5$ and R$_6$ are not C$_3$ alkyl concurrently.

3. A recording medium of claim 1 wherein R$_5$ is unsubstituted C$_1$-C$_3$ alkyl and R$_6$ is —(CH$_2$)$_a$—OCOR or —(CH$_2$)$_a$—OR where R is C$_1$-C$_3$ alkyl and a is 1-5.

4. A recording medium of claim 1 wherein the recording layer contains a compound of the formula (I) in the proportion of 50 to 100% by weight based on the total solids of said recording layer.

5. A recording medium of claim 1 wherein the recording layer contains a compound of the formula (II) in the proportion of 50 to 100% by weight based on the total solids of said recording layer.

6. A recording medium of claim 1 wherein the recording layer contains compounds of the formulas (I) and (II) in the proportion of 50 to 100% by weight based on the total solids of said recording layer.

7. A recording medium of claim 1 wherein the recording layer is provided directly on the substrate.

8. A recording medium of claim 1 wherein a protective layer is further provided on the recording layer.

9. A recording medium of claim 1 wherein the substrate is plastics.

10. A recording medium of claim 9 wherein the plastic substrate is an injection-molded polymethyl methacrylate or polycarbonate.

11. A recording medium of claim 1 wherein the recording layer contains further a stabilizer in the proportion of 0.02 to 1 mole per one mole of the compound.

12. A recording medium of claim 11 wherein the stabilizer is metal complex compounds, aminium compounds or triphenylamine compounds.

13. A recording medium of claim 1 wherein the recording layer has the thickness of 100 Å to 5000 Å.

14. A recording medium of claim 13 wherein the recording layer has the thickness of 200 Å to 1500 Å.

15. A recording medium of claim 14 wherein the recording layer has the thickness of 400 Å to 800 Å.

16. A recording medium of claim 1 wherein the recording layer is formed by coating a solvent solution containing a compound of claim 1 onto a plastic substrate.

17. A recording medium of claim 16 wherein the solvent is an alcoholic solvent or a mixed solvent thereof with other solvents.

18. A recording medium of claim 17 wherein the solvent is methanol, methanol/1,2-dichloroethane, methanol/acetone or methanol/Methyl Cellosolve.

* * * * *